(12) United States Patent
Oohira

(10) Patent No.: US 8,173,732 B2
(45) Date of Patent: May 8, 2012

(54) DIELECTRIC ELASTOMER COMPOSITION AND ANTENNA MEMBER

(75) Inventor: Kouya Oohira, Mie (JP)

(73) Assignee: NTN Corporation, Osaka (JP)

( * ) Notice: Subject to any disclaimer, the term of this patent is extended or adjusted under 35 U.S.C. 154(b) by 207 days.

(21) Appl. No.: 12/449,780

(22) PCT Filed: Feb. 28, 2008

(86) PCT No.: PCT/JP2008/053465
§ 371 (c)(1),
(2), (4) Date: Aug. 25, 2009

(87) PCT Pub. No.: WO2008/105483
PCT Pub. Date: Sep. 4, 2008

(65) Prior Publication Data
US 2010/0090905 A1    Apr. 15, 2010

(30) Foreign Application Priority Data

Feb. 28, 2007 (JP) ................ P2007-050750
Oct. 26, 2007 (JP) ................ P2007-279192

(51) Int. Cl.
*C08K 5/06* (2006.01)
(52) U.S. Cl. .................. 524/366; 524/442; 524/495
(58) Field of Classification Search .......... 524/366, 524/442, 495
See application file for complete search history.

(56) References Cited

U.S. PATENT DOCUMENTS

| | | |
|---|---|---|
| 4,430,470 A | 2/1984 | Taniguchi |
| 5,180,767 A | 1/1993 | Sakai |
| 5,589,219 A * | 12/1996 | Hayami ................ 427/117 |

FOREIGN PATENT DOCUMENTS

| | | |
|---|---|---|
| CN | 1969016 A | 5/2007 |
| EP | 1767582 A1 | 3/2007 |
| JP | 62-218432 A | 9/1987 |
| JP | 2000-336225 A | 12/2000 |
| JP | 2002-194149 A | 7/2002 |
| JP | 2005-97493 A | 4/2005 |
| JP | 2005-333516 A | 12/2005 |
| JP | 2005-1989 A | 1/2006 |
| JP | 2006-290939 | 10/2006 |
| WO | WO 2005/123841 A1 | 12/2005 |

OTHER PUBLICATIONS

PCT Search Report Dated May 1, 2008.

* cited by examiner

*Primary Examiner* — Edward Cain
(74) *Attorney, Agent, or Firm* — Hedman & Costigan, P.C.; Kathleen A. Costigan

(57) ABSTRACT

The present invention provides a dielectric elastomer composition which has been improved to have an excellent flame-retardant property in consideration of influence on environment and a satisfactory dielectric characteristic as a material for an antenna; and a member for the antenna formed by molding the dielectric elastomer composition. The dielectric elastomer composition contains 50 to 400 parts by weight of a metal hydroxide such as aluminum hydroxide powder, magnesium hydroxide powder and 10 to 200 parts by weight of a brominated flame retardant except polybromodiphenyl ether and polybromobiphenyl for 100 parts by weight of an elastomer such as ethylene propylene rubber. At a frequency of 1 GHz and a temperature of 30° C., a dielectric constant of the dielectric elastomer composition is not less than 3, and a dielectric loss tangent thereof is not more than 0.02. The member for the antenna is formed by molding the dielectric elastomer composition.

8 Claims, No Drawings

DIELECTRIC ELASTOMER COMPOSITION AND ANTENNA MEMBER

TECHNICAL FIELD

The present invention relates to a dielectric elastomer composition having excellent flame-retardant property and dielectric characteristic and an antenna member formed by molding the dielectric elastomer composition.

BACKGROUND ART

In recent years, with a remarkable spread of a mobile phones, a cordless phones, a patch antennas for a RFID, a lens antennas such as a radio telescope, a millimeter-wave radar, and the like and significant progress of a satellite communication apparatus, a communication signal is demanded to have a higher frequency, and communication apparatus is demanded to be more compact. As the dielectric constant of a material for an antenna incorporated inside the communication apparatus becomes higher, the communication signal is allowed to have a higher frequency, and the communication apparatus is allowed to be more compact. The dielectric constant and the dielectric loss tangent are parameters indicating the degree of a polarization inside a dielectric and the loss of an energy generated by a polarization inside the dielectric or by increasing conductivity thereto respectively. Therefore the use of the material for the antenna having a high dielectric constant allows the communication signal to have a higher frequency, circuits to be shorter, and the communication apparatus to be more compact. In addition, as the use form of the communication apparatus diversifies, the material for the antenna is demanded to have a low degree of a change in its electrical characteristic at low to high temperatures and be excellent in its flame-retardant property.

As a material for obtaining an antenna showing a high dielectric constant and having a low dielectric loss tangent in a wide temperature range from a low temperature to a high temperature, a dielectric elastomer composition is known. The dielectric elastomer composition contains the elastomer such as ethylene propylene rubber mixed with the barium•neodymium ceramic powder having a temperature coefficient $\alpha$ (unit: 1/° C.) of the dielectric constant is in the range of $(-200 \text{ to } 100) \times 10^{-6}$ in the temperature range from −40° C. to 100° C. (see patent document 1).

As a measure for improving the flame-retardant property of the material for the antenna, it is known that the material for the antenna contains a halogenated flame retardant such as a brominated flame retardant or a chlorinated flame retardant, for example, polybromodiphenyl ether (hereinafter referred to as PBDE), polybromobiphenyl (hereinafter referred to as PBB). To improve the flame-retardant property of the brominated flame retardant other than the PBB and the PBDE, normally the brominated flame retardant is used in combination with antimony trioxide.

It is known that to improve the flame-retardant property of the elastomer material, in addition to the halogenated flame retardant, the elastomer material contains a metal hydroxide, expanded graphite. It is known that the metal hydroxide is contained in the elastomer material composing a transfer belt and the like of an electrophotographic device (see patent document 2).

The dielectric elastomer composition disclosed in the patent document 1 has a low degree of a change in its electrical characteristic at low to high temperatures and an excellent dielectric characteristic but does not contain the flame retardant. Therefore the dielectric elastomer composition disclosed in the patent document 1 cannot be used for applications demanded to have the flame-retardant property.

In using the halogenated flame retardant as the flame retardant to improve the flame-retardant property of the dielectric elastomer composition, there is a fear that at the time of disposal, dioxin is generated from the halogenated flame retardant. Thus the use of the halogenated flame retardant is environmentally unpreferable. The PBB and the PBDE cannot be used for electrical and electronic products in accordance with the RoHS directive (Restriction of the use of certain hazardous substances in electrical and electronic equipment) established by the European Union (EU) in January of 2003.

Although the use of the brominated flame retardant other than the PBB and the PBDE is not prohibited, as described above, the brominated flame retardant other than the PBB and the PBDE is used in combination with the antimony trioxide. The use of the antimony trioxide is unpreferable because the antimony trioxide contains a slight amount of lead, mercury, hexavalent chrome, and cadmium as impurities.

When the metal hydroxide is used as the flame retardant, it is difficult to obtain the flame-retardant effect unless the elastomer material contains a large amount of the metal hydroxide. When the elastomer material contains a large amount of the metal hydroxide, generally the dielectric loss tangent becomes high. Thus it is not known to use the metal hydroxide for the material of the antenna or the like in which a low dielectric loss tangent is demanded.

In the case where the material for the antenna contains the expanded graphite, the flame-retardant property thereof is improved, but the dielectric characteristic thereof extremely deteriorates. Thus the use of the expanded graphite is unpreferable.

Patent document 1: Japanese Patent Application Laid-Open No. 2006-1989

Patent document 2: Japanese Patent Application Laid-Open No. 2005-97493

DISCLOSURE OF THE INVENTION

Problem to be Solved by the Invention

The present invention has been made to cope with the above-described problems. It is an object of the present invention to provide a dielectric elastomer composition which has been improved to have an excellent flame-retardant property in consideration of influence on environment and a satisfactory dielectric characteristic when it is used as an antenna material; and an antenna member formed by molding the dielectric elastomer composition.

Means for Solving the Problems

The dielectric elastomer composition of the present invention contains 50 to 400 parts by weight of a metal hydroxide and 10 to 200 parts by weight of a brominated flame retardant except PBDE and PBB for 100 parts by weight of an elastomer, wherein at a frequency of 1 GHz and a temperature of 30° C., a dielectric constant of the dielectric elastomer composition is not less than 3, and a dielectric loss tangent thereof is not more than 0.02.

In the dielectric elastomer composition, 5 to 40 parts by weight of a carbon black is mixed with 100 parts by weight of the elastomer.

The dielectric elastomer composition contains a dielectric ceramic powder. The metal hydroxide is at least one powder selected from among aluminum hydroxide powder and magnesium hydroxide powder.

The brominated flame retardant is ethylenebispentabromobenzene or decabromodiphenyl ether.

The elastomer is ethylene propylene rubber.

The antenna member of the present invention is formed by molding a dielectric elastomer composition. The dielectric elastomer composition for the antenna member is the above-described dielectric elastomer composition. The antenna member has an electrode formed on a surface thereof.

EFFECT OF THE INVENTION

The dielectric elastomer composition of the present invention contains 50 to 400 parts by weight of the metal hydroxide as the flame retardant thereof and 10 to 200 parts by weight of the brominated flame retardant except PBDE and PBB for 100 parts by weight of the elastomer, wherein at a frequency of 1 GHz and a temperature of 30° C., the dielectric constant of the dielectric elastomer composition is not less than 3, and the dielectric loss tangent thereof is not more than 0.02. Therefore the dielectric elastomer composition maintains a satisfactory dielectric characteristic as a material for the antenna and is excellent in its flame-retardant property.

In the dielectric elastomer composition, 5 to 40 parts by weight of the carbon black is mixed with 100 parts by weight of the elastomer. Thereby process oil does not bleed on the surface of a molding, and the adhesion of the dielectric elastomer composition to the electrode does not deteriorate. Therefore it is possible to restrain a change of the dielectric characteristic of the antenna member composed of the dielectric elastomer composition.

The metal hydroxide and the brominated flame retardant are used in combination. Therefore although the brominated flame retardant other than the PBDE and the PBB are used, the dielectric elastomer composition is allowed to securely obtain the excellent flame-retardant property without using the antimony trioxide in combination with the brominated flame retardant. Therefore the dielectric elastomer composition is environmentally preferable. Compared with a dielectric elastomer composition containing only the metal hydroxide as the flame retardant, in the present invention, it is possible to decrease the mixing amount of the metal hydroxide of the dielectric elastomer composition and hence prevent moldability from deteriorating and the dielectric loss tangent from becoming high.

Because the dielectric elastomer composition contains the dielectric ceramic powder, the dielectric elastomer composition has a higher dielectric constant than a dielectric elastomer composition not containing the dielectric ceramic powder.

Because the antenna member of the present invention is formed by molding the dielectric elastomer composition, the antenna member has a high dielectric constant and a low dielectric loss tangent and is excellent in its flame-retardant property.

BEST MODE FOR CARRYING OUT THE INVENTION

As described above, when the metal hydroxide is used as the flame retardant, it is difficult for the dielectric elastomer composition to obtain a flame-retardant effect unless the dielectric elastomer composition contains a large amount of the metal hydroxide. When the dielectric elastomer composition contains a large amount of the metal hydroxide, generally the dielectric loss tangent thereof becomes high. Thus the metal hydroxide has not been used for the material for the antenna. Because the brominated flame retardant (except PBB, PBDE) excellent in the flame-retardant property is used in combination with the antimony trioxide, the use of the brominated flame retardant is environmentally unpreferable.

In consideration of the above-described problems, the present inventors have used the metal hydroxide serving as the flame retardant and the brominated flame retardant (except PBB, PBDE) in combination and investigated various mixing ratios therebetween. Thereby without using the antimony trioxide, they have obtained the dielectric elastomer composition which applies a load to environment to a possible lowest degree and has satisfactory dielectric characteristic and flame-retardant property when it is used as the material for the antenna. The present invention is based on the above-described knowledge.

As the metal hydroxide which can be used in the present invention, magnesium hydroxide, aluminum hydroxide, dawsonite, calcium aluminate oxide, calcium hydroxide, barium hydroxide, hydrotalcite, and the like are listed. These metal hydroxides make endothermic dehydration reaction under high heat, thus absorbing heat and discharging water molecules. Thereby these metal hydroxides decrease the temperature and are capable of imparting flame-retardant property to the dielectric elastomer composition. To improve dispersibility and processability, the above-described metal hydroxides may be surface-treated with a silane-containing coupling agent, a titanate-containing coupling agent, an epoxy-based surface-treating agent, higher fatty acid or salts thereof, higher alcohols or a surface-active agent.

These metal hydroxides may be used singly or in combination of not less than two kinds. In using not less than two kinds of the metal hydroxides, respective metal hydroxides start the endothermic dehydration reaction at different temperatures. Thus it is possible to impart more excellent flame-retardant property to the dielectric elastomer composition.

Of the above-described metal hydroxides, at least one metal hydroxide selected from among magnesium hydroxide powder and aluminum hydroxide powder is preferable because they are inexpensive and contain a large amount of a hydrate. It is preferable that the magnesium hydroxide powder and the aluminum hydroxide powder are in the range not more than 1 to 20 $m^2/g$ in the BET specific surface area thereof and in the range of 0.1 to 50 μm in the average particle diameter thereof. The decomposition temperature of the magnesium hydroxide powder and the aluminum hydroxide powder are 300 to 350° C. and 200 to 230° C. respectively.

As methods of surface-treating the magnesium hydroxide powder and the aluminum hydroxide powder by using the silane-containing coupling agent, a dry method and a wet slurry method can be adopted. Other than the above-described surface treatment which is performed in advance, it is possible to perform surface treatment by adding the silane-containing coupling agent to the dielectric elastomer composition and mixing the components with one another.

In surface-treating the magnesium hydroxide powder and the aluminum hydroxide powder with the higher fatty acid or the salts thereof, it is possible to adopt a method of melting the higher fatty acid or the salts thereof and spraying them and surface-treating the magnesium hydroxide powder and the aluminum hydroxide powder with a Henschel mixer by using the dry method. As the higher fatty acid and the salts thereof, stearic acid, oleic acid, palmitic acid, lauric acid, and sodium and potassium salts thereof are used.

As commercially available products of the magnesium hydroxide powder that can be used in the present invention, it is possible to list WX-3 (average particle diameter: 2.5 μm, not surface-treated), WH-3 (average particle diameter: 2.5 μm, surface-treated), N-4 (average particle diameter: 1.1 μm, surface-treated (higher fatty acid)), and N-6 (average particle diameter: 1.3 μm, surface-treated) all produced by Konoshima Chemical Co., Ltd.; Kisuma 5A (average particle diameter: 0.85 μm, surface-treated) and Kisuma 5B (average particle diameter: 0.87 μm, surface-treated) all produced by Kyowa Chemical Industry Co., Ltd.; MGZ-1 (average particle diameter: 0.8 μm, surface-treated) and MGZ-3 (average particle diameter: 0.1 μm, surface-treated) all produced by Sakai Chemical Industry Co., Ltd.; and Echomag Z-10 produced by Tateho Chemical Industries Co., Ltd. As commercially available products of the aluminum hydroxide powder, B703S (average particle diameter: 2 μm) produced by Nippon Light Metal Co., Ltd. is listed.

As the brominated flame retardant of the present invention, it is possible to use any brominated flame retardant except PBDE and PBB. For example, ethylenebispentabromobenzene, decabromodiphenyl ether, TBA-bis(2,3-dibromopropyl ether), bis(3,5-dibromo-4-dibromopropyloxyphenyl)sulfone, triarylisocyanate hexabromide, hexabromocyclododecane, octabromodiphenyl ether, tetrabromobisphenol A, ethylenebistetrabromophthalimide, and brominated polystyrene are listed.

Of these brominated flame retardants, ethylenebispentabromobenzene and decabromodiphenyl ether are preferable because these brominated flame retardants have a high melting point of not less than 300° C. and a high bromination ratio of not less than 80%. As commercially available products of the ethylenebispentabromobenzene and the decabromodiphenyl ether, FCP801 produced by Suzuhiro Chemical Co., Ltd. and FCP83D produced by Suzuhiro Chemical Co., Ltd. are listed respectively.

In the dielectric elastomer composition of the present invention, the mixing ratio of the metal hydroxide and that of the brominated flame retardant for 100 parts by weight of the elastomer are set to 50 to 400 parts by weight and 10 to 200 parts by weight respectively. It is favorable that the mixing ratio of the metal hydroxide and that of the brominated flame retardant for 100 parts by weight of the elastomer are set to 50 to 300 parts by weight and 50 to 200 parts by weight respectively. It is more favorable that the mixing ratio of the metal hydroxide and that of the brominated flame retardant for 100 parts by weight of the elastomer are set to 100 to 250 parts by weight and 50 to 100 parts by weight respectively.

When the mixing ratio of the metal hydroxide is less than 50 parts by weight, it is necessary to mix a large amount of the brominated flame retardant with the elastomer to securely obtain the flame-retardant property, which deteriorates moldability, increases the dielectric loss tangent, and is environmentally unpreferable. When the mixing ratio of the metal hydroxide is more than 400 parts by weight, there arise problems that the moldability deteriorates and the dielectric loss tangent increases. By mixing the metal hydroxide with the elastomer in the above-described range, it is possible to obtain the effect that a temperature change of the dielectric constant can be reduced.

When the mixing ratio of the brominated flame retardant is less than 10 parts by weight, it is impossible to obtain a sufficient flame-retardant property (see test shown in example described later) in the above-described range of the mixing ratio of the metal hydroxide.

It is possible to use any elastomers composing the dielectric elastomer composition of the present invention, provided that they have a dielectric constant of not less than 3 and a dielectric loss tangent of not more than 0.02 (favorably not more than 0.01) at a frequency of 1 GHz and a temperature of 30° C. when the metal hydroxide and the brominated flame retardant are mixed therewith. It is possible to use a natural rubber elastomer and a synthetic rubber elastomer.

As the natural rubber elastomer, it is possible to list natural rubber, chlorinated rubber, hydrochlorinated rubber, cyclized rubber, maleic rubber, hydrogenated rubber, graft-modified rubber by grafting a vinyl monomer such as methyl methacrylate, acrylonitrile, methacrylate ester with double bond of the natural rubber, and a block polymer formed by kneading the natural rubber in a nitrogen gas stream in the presence of a monomer. In addition to natural rubber elastomer whose material is the natural rubber, it is possible to list elastomers whose material is synthetic cis-1,4-polyisoprene as the natural rubber elastomer.

As the synthetic rubber elastomer, it is possible to list a polyolefin elastomer such as isobutylene rubber, ethylene propylene rubber, ethylene-propylene-diene rubber, ethylene-propylene terpolymer, chlorosulfonated polyethylene rubber; a styrene elastomer such as styrene-isoprene-styrene block copolymer (SIS), styrene-butadiene-styrene copolymer (SBS), styrene-ethylene-butylene-styrene block copolymer (SEBS); isoprene rubber; urethane rubber; epichlorohydrin rubber; silicone rubber; nylon 12; butyl rubber; butadiene rubber; polynorbornene rubber, acrylonitrile-butadiene rubber and the like.

These elastomers can be used by mixing one kind or not less than two kinds thereof. In the range in which the elasticity of the elastomers do not deteriorate, it is possible to use by mixing one kind or not less than two kinds of thermoplastic resin.

When one kind or not less than two kinds elastomers selected from among the natural rubber elastomer and/or the synthetic non-polar elastomer are used as the elastomer in the present invention, it is possible to obtain a dielectric elastomer being excellent in an electrical insulating property. As the synthetic non-polar elastomer, of the above-described synthetic rubber elastomers, it is possible to list the ethylene propylene rubber, the ethylene-propylene-diene rubber, the isobutylene rubber, and the isoprene rubber. Because the ethylene propylene rubber and the ethylene-propylene-diene rubber have a very low dielectric loss tangent, these synthetic non-polar elastomers can be preferably used as materials for the antenna member.

As the carbon black which can be used in the present invention, it is possible to list pigments such as hard carbon and soft carbon and carbon black used to improve wear resistance. But acetylene-based carbon black having a high conductivity is unpreferable because it greatly increases the dielectric loss tangent. As commercially available products of the carbon black, it is possible to exemplify SEAST S produced by Tokai Carbon Co., Ltd.

The mixing ratio of the above-described carbon black for 100 parts by weight of the elastomer is 5 to 40 parts by weight. It is unpreferable that the mixing ratio of the carbon black for 100 parts by weight of the elastomer is less than 5 parts by weight, because the carbon black has an oil-holding effect to a low extent and thereby process oil bleeds on the surface of a molding, the adhesion of the dielectric elastomer composition to an electrode deteriorates, which greatly changes the dielectric characteristic. It is unpreferable that the mixing ratio of the carbon black for 100 parts by weight of the elastomer is more than 40 parts by weight, because the dielectric loss tangent becomes large. To obtain a high dielectric constant and a low dielectric loss tangent, the optimum mixing ratio of the carbon black for 100 parts by weight of the elastomer is 10 to 35 parts by weight.

To improve the dielectric constant of the dielectric elastomer composition, it is preferable that the dielectric elastomer composition of the present invention contains dielectric ceramic powder.

It is preferable that the dielectric ceramic powder which can be used in the present invention is at least one substance selected from among oxides of groups IIa, IVa, IIIb, and IVb; carbonates, phosphates, silicates; and composite oxides containing the groups IIa, IVa, IIIb, and IVb. More specifically, $TiO_2$, $CaTiO_3$, $MgTiO_3$, $Al_2O_3$, $BaTiO_3$, $SrTiO_3$, $Ca_2P_2O_7$, $SiO_2$, $Mg_2SiO_4$, $Ca_2MgSi_2O_7$ or $BaO$—$TiO_2$—$Nd_2O_3$-based ceramics containing alkali earth metal and rare earth oxide which are used to improve the temperature-dependent property of the dielectric constant are listed. The dielectric ceramic powder to be contained in the dielectric elastomer composition is not limited to a specific one, provided that the dielectric ceramic powder shows a dielectric characteristic. To improve the dielectric characteristic, a trace composition such as Al, Zr or the like may be contained in the dielectric elastomer composition.

The average particle diameter of the dielectric ceramic powder is preferably 0.01 to 100 μm. It is unpreferable that the average particle diameter of the dielectric ceramic powder is less than 0.01 μm, because it is difficult to handle the dielectric ceramic powder and the dielectric ceramic powder inhibits a binding power. It is unpreferable that the average particle diameter of the dielectric ceramic powder is more than 100 μm, because there is a fear that variation of the dielectric characteristic is caused in a molding. More practical range is 0.1 to 20 μm.

In the dielectric elastomer composition of the present invention, the mixing ratio of the dielectric ceramic powder to 100 parts by weight of elastomer is favorably 50 to 1000 parts by weight and more favorably 200 to 900 parts by weight. It is possible to improve the dielectric constant of the dielectric elastomer composition containing the dielectric ceramic powder in the above-described range by 2 to 20 over the dielectric elastomer composition not containing the dielectric ceramic powder.

In the present invention, in the range in which the effect of the present invention is not damaged, (1) to improve the affinity of the interface of the elastomer and the ceramic powder, the adhesiveness of the elastomer to the ceramic powder, and the mechanical strength of the dielectric elastomer composition, the dielectric elastomer composition is capable of containing a coupling agent such as a silane-containing coupling agent, a titanate-containing coupling agent, a zirconia•aluminate-containing coupling agent or the like (2) to improve the plating property for forming an electrode, the dielectric elastomer composition is capable of containing a filler such as talc, calcium pyrophosphate or the like consisting of fine particle, (3) to improve the heat stability of the dielectric elastomer composition to a high extent, it is capable of containing an antioxidant, (4) to improve the light resistance of the dielectric elastomer composition, it is capable of containing a light stabilizer such as a ultraviolet absorber, (5) to improve the shock resistance of the dielectric elastomer composition, it is capable of containing a shock resistance improver, (6) to color the dielectric elastomer composition, it is capable of containing a coloring agent such as dye, pigment or the like, (7) to adjust the property of the dielectric elastomer composition, it is capable of containing a cross-linking agent such as plasticizer, sulfur, peroxide or the like, and (8) to accelerate vulcanization, the dielectric elastomer composition is capable of containing a vulcanization accelerator.

In the range in which the effect of the present invention is not interfered, the dielectric elastomer composition of the present invention can be used in combination with fibers of an alkali metal salt of titanic acid such as glass fiber, potassium titanate whisker; fibers of a metal salt of boric acid such as titanium oxide fiber, magnesium borate whisker, aluminum borate whisker; fibers of a metal salt of silicic acid such as zinc silicate whisker, magnesium silicate whisker; and various organic or inorganic fillers such as carbon fiber, alumina fiber, and aramid fiber.

The method of producing the dielectric elastomer composition of the present invention is not limited to a specific method, but various mixing molding methods can be used. It is possible to exemplify a method of mixing the carbon black, the metal hydroxide, the brominated flame retardant, the dielectric ceramic powder, various additives, a vulcanizing agent and the like with the elastomer and kneading the mixture with a Banbury mixer, a roller, a biaxial extruder or the like.

The member for the antenna of the present invention is obtained by molding the dielectric elastomer composition obtained by using the above-described method into a predetermined shapes, for example, the shape of a flat plate or circular plate. As a molding method, it is possible to adopt any arbitrary method such as heated compression molding, injection molding, transfer molding, extrusion molding.

EXAMPLES

Examples 1 to 15 and Comparative Examples 1 to 7

Ethylene propylene rubber (EPT-3095 produced by Mitsui Chemicals, Inc.), magnesium hydroxide (WX-3 or N-4 produced by Konoshima Chemical Co., Ltd.), brominated flame retardant (FCP801 or FCP83D produced by Suzuhiro Chemical Co., Ltd.), dielectric ceramic powder (HF120 or STNAS produced by KCM Corporation Co., Ltd.), carbon black (SEAST S produced by Tokai Carbon Co., Ltd.) were mixed with one another at the mixing ratio shown in table 1. In addition, a processing aid containing a vulcanization accelerator and process oil (PW380 produced by Idemitsu Kosan Co., Ltd.) was added to the mixture of the above-described components. After the mixture was kneaded by a press kneader, a sheet molding of each of the examples and the comparative examples having a dimension of 150 mm×t2 mm was obtained by heated compression molding. The molding was processed into a specimen having a dimension of 13 mm×2 mm×100 mm. The vulcanization condition for each specimen was 170° C.×20 minutes.

The flame-retardant property, dielectric constant, dielectric loss tangent, and whether bleeding occurred were measured on the specimen of the dielectric elastomer molding obtained in each of the examples and the comparative examples by a method described below. Table 1 shows the measured results. As the ethylene propylene rubber, in addition to the EPT-3095 produced by Mitsui Chemicals, Inc., EP35 produced by JSR Corporation. can be used.

<Test for Examining Flame-Retardant Property>

With flame of a gas burner in contact with each of the obtained specimens vertically placed, each specimen was left for 10 seconds. Immediately after 10 seconds elapsed, the gas burner was moved apart from the specimen and the burning state was checked. The burning period of time was measured. After the fire of the specimen went out of itself, the flame of the gas burner was brought into contact with the specimen again. The specimen was left for 10 seconds. Immediately after 10 seconds elapsed, the gas burner was moved apart from the specimen to check the burning period of time. Specimens whose fire went out of themselves within 10 seconds in the first and second checking and whose embers burnt out within 10 seconds were judged to have sufficiently flame-retardant property and marked by "good", whereas specimens whose fire went out of themselves in not less than 10 seconds and whose embers did not burn out within 10 seconds were judged to have insufficiently flame-retardant property and marked by "bad".

<Measurement of Dielectric Constant and Dielectric Loss Tangent>

Each of the obtained molding was processed into a rectangular specimen having a dimension of 1.5 mm×1.5 mm×80 mm. By using a cavity resonator method (pages 16 to 19 of magazine "Electronic Monthly" published in July of 1998), the dielectric constant and the dielectric loss tangent of each specimen were measured at 30° C. in a frequency band of 1 GHz.

<Test for Examining Whether Bleeding Occurred>

The surface of a molding having a dimension of 100 mm×80 mm×2.0 mm obtained by heated compression molding was visually inspected to observe whether the process oil bled thereon.

tained a large amount of the carbon black, the dielectric loss tangent thereof exceeded 0.02. Because the specimen of the comparative example 6 contained a large amount of the brominated flame retardant, it was excellent in the flame-retardant property thereof, but had a high dielectric loss tangent. Because the specimen of the comparative example 4 contained so large an amount of the flame retardant, it could not be molded.

INDUSTRIAL APPLICABILITY

The dielectric elastomer composition of the present invention applies little load to environment and has excellent flame-retardant property and dielectric characteristic. Therefore the dielectric elastomer composition can be preferably utilized as materials for electronic parts such as an antenna of a high-frequency communication apparatus, a circuit substrate, a filter, a resonator, a capacitor, a piezoelectric element, and the like.

TABLE 1

| | Mixing ratio of each component of dielectric elastomer composition (part by weight) | | | | | | | Dielectric elastomer molding | | | |
|---|---|---|---|---|---|---|---|---|---|---|---|
| | Ethylene propylene rubber | Ceramic powder | Carbon black | Metal hydroxide | | Brominated flame retardant | | Flame-retardant property | 1 GHz, 30° C. | | Bleeding |
| | | HF120 | STNAS | SEASTS | WX-3 | N-4 | FCP801 | FCP83D | | Dielectric constant | Dielectric loss tangent | |
| Example | | | | | | | | | | | | |
| 1 | 100 | — | 200 | 5 | — | 300 | 50 | — | Good | 7.2 | 0.005 | Did not occur |
| 2 | 100 | — | 200 | 25 | — | 300 | 50 | — | Good | 7.4 | 0.005 | Did not occur |
| 3 | 100 | — | 200 | 40 | — | 300 | 50 | — | Good | 7.7 | 0.006 | Did not occur |
| 4 | 100 | — | 200 | 25 | 300 | — | 100 | — | Good | 6.8 | 0.007 | Did not occur |
| 5 | 100 | — | 200 | 25 | — | 50 | 150 | — | Good | 7.3 | 0.006 | Did not occur |
| 6 | 100 | — | 200 | 25 | 100 | — | 200 | — | Good | 7.0 | 0.008 | Did not occur |
| 7 | 100 | — | 300 | 25 | — | 200 | 50 | — | Good | 8.7 | 0.005 | Did not occur |
| 8 | 100 | — | 350 | 25 | — | 200 | 50 | — | Good | 9.5 | 0.005 | Did not occur |
| 9 | 100 | — | 350 | 25 | — | 200 | — | 50 | Good | 8.6 | 0.006 | Did not occur |
| 10 | 100 | — | 350 | 25 | 300 | — | 100 | — | Good | 7.6 | 0.005 | Did not occur |
| 11 | 100 | 450 | — | 5 | — | 200 | — | 50 | Good | 8.1 | 0.006 | Did not occur |
| 12 | 100 | 450 | — | 25 | — | 200 | — | 50 | Good | 8.2 | 0.007 | Did not occur |
| 13 | 100 | 450 | — | 40 | — | 200 | — | 50 | Good | 8.5 | 0.008 | Did not occur |
| 14 | 100 | 600 | — | 25 | — | 100 | — | 100 | Good | 9.5 | 0.006 | Did not occur |
| 15 | 100 | 900 | — | 25 | — | 50 | — | 150 | Good | 14.8 | 0.007 | Did not occur |
| Comparative Example | | | | | | | | | | | | |
| 1 | 100 | — | 200 | 25 | — | — | 50 | — | Bad (Flammable) | 7.8 | 0.005 | Did not occur |
| 2 | 100 | — | 200 | 0 | — | 300 | 50 | — | Good | 7.3 | 0.005 | Occurred |
| 3 | 100 | — | 200 | 60 | — | 300 | 50 | — | Good | 7.8 | 0.025 | Did not occur |
| 4 | 100 | — | 200 | 25 | 600 | — | 200 | — | (Unmoldable) | — | — | Did not occur |
| 5 | 100 | — | 200 | 25 | 200 | — | — | — | Bad (Flammable) | 7.3 | 0.006 | Did not occur |
| 6 | 100 | — | 200 | 25 | 200 | — | 400 | — | Good | 5.8 | 0.030 | Did not occur |
| 7 | 100 | — | 300 | 25 | 300 | — | — | — | Bad (Flammable) | 7.8 | 0.008 | Did not occur |

As shown in table 1, the specimens of the examples 1 to 15 were excellent in the flame-retardant property thereof and had the dielectric loss tangent of not more than 0.01.

On the other hand, in the specimens of the comparative examples 1, 5, and 7, the mixing ratio of the metal hydroxide and that of the brominated flame retardant were not in the predetermined range of the mixing ratio. Thus they were inferior in the flame-retardant property thereof. Because the specimen of the comparative example 2 did not contain the carbon black, bleeding occurred on the surface thereof. Because the specimen of the comparative example 3 con-

The invention claimed is:

1. A dielectric elastomer composition comprising 50 to 400 parts by weight of a metal hydroxide, 10 to 200 parts by weight of a brominated flame retardant except polybromodiphenyl ether and polybromobiphenyl, and 100 parts by weight of an elastomer,
   wherein at a frequency of 1 GHz and a temperature of 30° C., a dielectric constant of said dielectric elastomer composition is not less than 3, and a dielectric loss tangent thereof is not more than 0.02,
   wherein 5 to 40 parts by weight of carbon black is contained for 100 parts by weight of said elastomer.

2. A dielectric elastomer composition comprising 50 to 400 parts by weight of a metal hydroxide, 10 to 200 parts by weight of a brominated flame retardant except polybromodiphenyl ether and polybromobiphenyl, and 100 parts by weight of an elastomer,
  wherein at a frequency of 1 GHz and a temperature of 30° C., a dielectric constant of said dielectric elastomer composition is not less than 3, and a dielectric loss tangent thereof is not more than 0.02,
  wherein a dielectric ceramic powder is contained in said dielectric elastomer composition.

3. The dielectric elastomer composition according to claim 1 or 2, wherein said metal hydroxide is at least one powder selected from among aluminum hydroxide powder and magnesium hydroxide powder.

4. The dielectric elastomer composition according to claim 1 or 2, wherein said brominated flame retardant is ethylenebispentabromobenzene.

5. The dielectric elastomer composition according to claim 1 or 2, wherein said elastomer is ethylene propylene rubber.

6. An antenna member formed by molding a dielectric elastomer composition according to claim 1 or 2.

7. The antenna member according to claim 6 comprises an electrode formed on a surface thereof.

8. The dielectric elastomer composition according to claim 6, wherein a dielectric ceramic powder is contained in said dielectric elastomer composition.

* * * * *